US009571700B2

(12) United States Patent
Saito

(10) Patent No.: US 9,571,700 B2
(45) Date of Patent: Feb. 14, 2017

(54) GENERATE NEW PROCESSED IMAGE DATA FROM STORED ORIGINAL IMAGE DATA WITH CORRECTED SETTING FOR PREDETERMINED IMAGE PROCESSING WHILE OUTPUTTING PROCESSED IMAGE DATA BEFORE CORRECTION

(71) Applicant: KONICA MINOLTA, INC., Chiyoda-ku, Tokyo (JP)

(72) Inventor: Daijiro Saito, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/694,728

(22) Filed: Apr. 23, 2015

(65) Prior Publication Data
US 2015/0317544 A1 Nov. 5, 2015

(30) Foreign Application Priority Data
May 1, 2014 (JP) .................................. 2014-094615

(51) Int. Cl.
*H04N 1/60* (2006.01)
*G06K 15/12* (2006.01)
(Continued)

(52) U.S. Cl.
CPC .......... *H04N 1/6027* (2013.01); *G06K 15/022* (2013.01); *G06K 15/129* (2013.01);
(Continued)

(58) Field of Classification Search
None
See application file for complete search history.

(56) References Cited

U.S. PATENT DOCUMENTS

2011/0221817 A1* 9/2011 Yamashita ............. B41J 13/025
347/16
2012/0002236 A1* 1/2012 Ebisui ................. G03G 15/5004
358/1.15
(Continued)

FOREIGN PATENT DOCUMENTS

JP 2007181118 A 7/2007
JP 2007268787 A * 10/2007
JP 2010171824 A * 8/2010

OTHER PUBLICATIONS

AIPN translation of JP 2007268787 "Printing Equipment" to Kondo, attached as JP 2007 268787.pdf.*

*Primary Examiner* — Christopher D Wait
(74) *Attorney, Agent, or Firm* — Holtz, Holtz & Volek PC

(57) ABSTRACT

An image processing apparatus, including: an output image processing section which performs, on image data, predetermined image processing according to image formation; an output section that outputs processed image data, on which the image processing is performed, in accordance with an operation timing according to the image formation by an image forming section; a correction section which corrects setting of the image processing on the image data; an image processing control section which controls an operation of the output image processing section, stores the processed image data in an external storage section and controls the correction section to perform correction depending on a predetermined correction condition; and an output control section which reads out the processed image data from the external storage section and inputs the processed image data to the output section.

9 Claims, 6 Drawing Sheets

(51) Int. Cl.
*G06T 11/00* (2006.01)
*G06K 15/02* (2006.01)

(52) U.S. Cl.
CPC ..... *G06K 15/1828* (2013.01); *G06K 15/1878* (2013.01); *G06K 15/1881* (2013.01); *G06T 11/001* (2013.01)

(56) References Cited

U.S. PATENT DOCUMENTS

2014/0063513 A1\*  3/2014  Enge .................. G06K 15/1868
  358/1.8
2014/0146329 A1\*  5/2014  Mizes .................... B41J 11/008
  358/1.5

\* cited by examiner

GENERATE NEW PROCESSED IMAGE DATA FROM STORED ORIGINAL IMAGE DATA WITH CORRECTED SETTING FOR PREDETERMINED IMAGE PROCESSING WHILE OUTPUTTING PROCESSED IMAGE DATA BEFORE CORRECTION

BACKGROUND OF THE INVENTION

1. Field of the Invention

The present invention relates to an image processing apparatus and an image forming apparatus.

2. Description of Related Art

Conventionally, there have been image forming apparatuses (printers) which output a large amount of same images mainly for commercial and industrial use. The image forming apparatuses are required to speed up the output and control operations to maintain high image quality.

Accordingly, the output of the plurality of images which are the output targets is interrupted by test images to perform detection and correction of image quality as needed in parallel with the image formation. At this time, image data on which image processing after the correction was performed is held and directly used for the image formation, and thus, it is not necessary to form images after performing the correction to the original image data every time, and the image formation can be performed fast with low load.

However, image data is used not only for a single image forming apparatus, but also for other image forming apparatuses and for data output and display output without performing image formation. In such case, when the original image is replaced with the image to which image processing was performed and the image is stored, problems occur in a case where the image is output to other than the image forming apparatus. Thus, Japanese Patent Application Laid Open Publication No. 2007-181118 describes a technique which can selectively determine which of the image after image processing and the image before image processing is to be stored.

However, in image formation for industrial use, an image which is the image formation target is repeatedly output to continuous recording medium (continuous form paper) a plurality of times and necessary parts are cut out. In such case, a plurality of images are normally formed at small intervals so as to eliminate waste of recording medium. As a result, image data is output to the printer engine at small intervals, and the conventional configurations have a problem that high speed image formation is obstructed even if data for correction is acquired since there is no sufficient time to reflect and output the corrected data as a parameter for image processing according to the image formation at small intervals.

SUMMARY OF THE INVENTION

An object of the present invention is to provide an image processing apparatus and an image forming apparatus which can output formed images at high speed while correcting image quality easily and without increasing the sizes thereof.

In order to achieve at least one of the above objects, according to one aspect of the present invention, there is provided an image processing apparatus, including: an output image processing section which performs, on image data, predetermined image processing according to image formation; an output section that outputs processed image data, on which the image processing is performed, in accordance with an operation timing according to the image formation by an image forming section; a correction section which corrects setting of the image processing on the image data; an image processing control section which controls an operation of the output image processing section, stores the processed image data in an external storage section and controls the correction section to perform correction depending on a predetermined correction condition; and an output control section which reads out the processed image data from the external storage section and inputs the processed image data to the output section, wherein the output control section repeatedly inputs the processed image data from the external storage section to the output section during a repeating operation of forming a same image on continuous recording medium by the image forming section, and the output control section switches the processed image data to be input to the output section when the processed image data after the correction is stored in the external storage section by the image processing control section during the repeating operation.

Preferably, in the above image processing apparatus, the predetermined image processing includes density correction and color tone correction.

Preferably, in the above image processing apparatus, the processed image data is stored in an external storage section in which the image data is stored.

Preferably, in the above image processing apparatus, the image data includes pieces of data for a plurality of colors according to a color image.

Preferably, in the above image processing apparatus, the image forming section which performs the image formation performs optical scanning, exposure and development on different photoreceptors on the basis of the respective pieces of data for the plurality of colors, and transfers developed images onto recording medium so as to be superposed on each other, and the output section outputs the pieces of data for the plurality of colors in accordance with respective shifts of timings of the optical scanning.

Preferably, the above image processing apparatus further includes an output timing switching section which switches between an output timing of the processed image data in a case where image formation is repeatedly performed on the continuous recording medium and an output timing of the processed image data in a case where image formation is performed on each divided piece of recording medium.

Preferably, the above image processing apparatus further includes a clock input switching section which switches on and off input of a clock signal to the output image processing section, wherein the clock input switching section switches off the input of the clock signal to the output image processing section after the processed image data is output until the correction is performed.

Preferably, the above image processing apparatus further includes a power source switching section which switches on and off power supply to the output image processing section, wherein the power source switching section switches off the power supply to the output image processing section after the processed image data is output until the correction is performed.

According to another aspect of the present invention, there is provided an image forming apparatus, including: the above image processing apparatus; the external storage section; the image forming section; and an image quality monitoring section which monitors image quality of an image formed by the image forming section using the processed image data and determines whether to make the correction section correct the setting of the image processing by the output image processing section on the basis of a predetermined image quality condition.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein.

DETAILED DESCRIPTION OF THE PREFERRED EMBODIMENT

Hereinafter, an embodiment of the present invention will be described with reference to the drawings.

Figure 1:
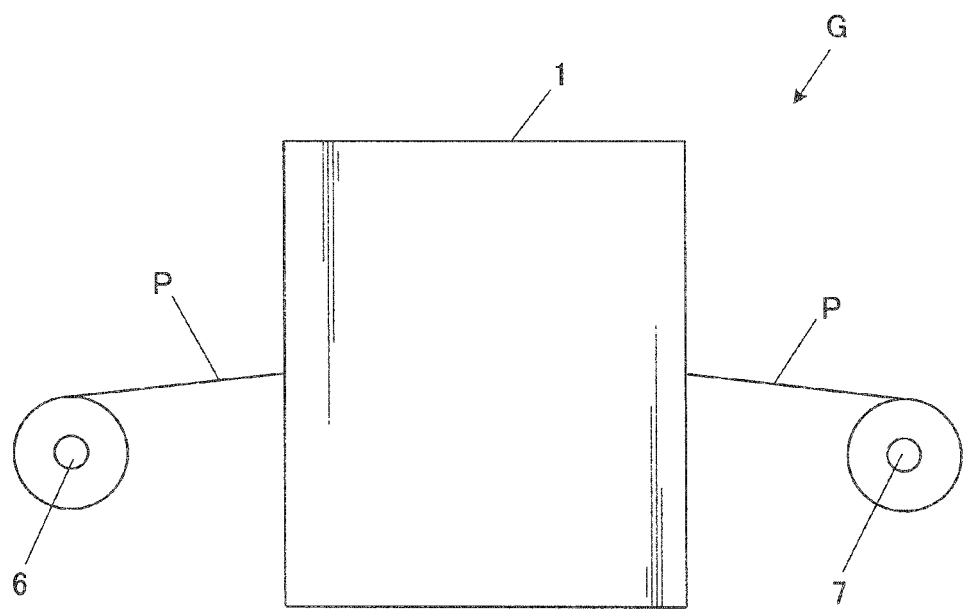
FIG. 1 is an external view showing an image forming apparatus in an embodiment of the present invention.

FIG. 1 is an external view of an image forming apparatus G in the embodiment.

The image forming apparatus G is an electrophotographic image forming apparatus (laser printer) which can form images on continuous form paper (continuous form, continuous recording medium). Continuous form P is supplied by a paper feeding roller 6 to form images thereon in an image forming apparatus main body 1, and the continuous form P is rolled by a paper ejection roller 7 to be ejected from the image forming apparatus main body 1. The image forming apparatus G may also include a paper feeding switching section (paper feeding switching section) which switches to feeding cut paper (recording medium divided into pieces) from a paper feeding tray separately provided in the image forming apparatus main body 1 to form images thereon.

Figure 2:
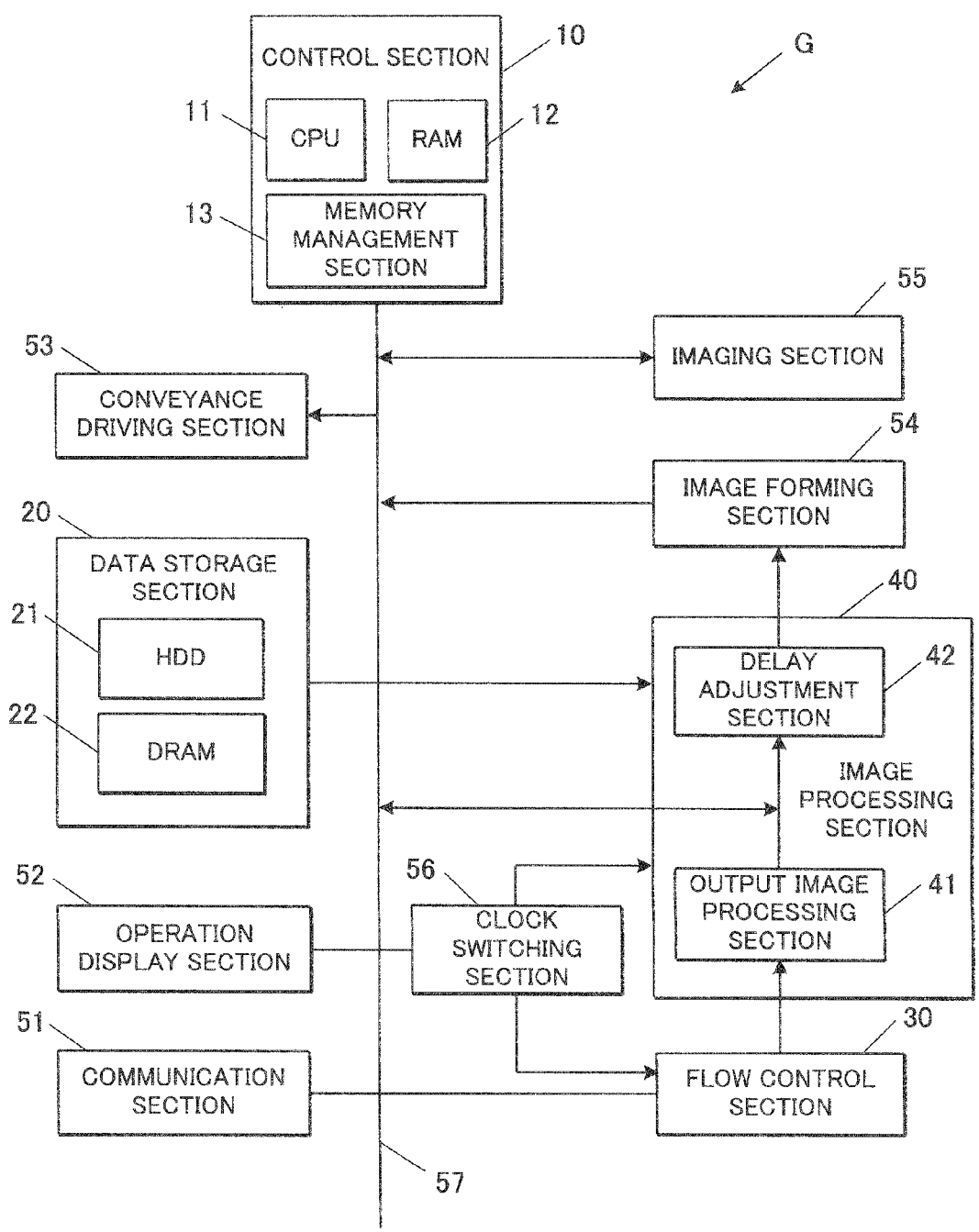
FIG. 2 is a block diagram showing an internal configuration of the image forming apparatus.

FIG. 2 is a block diagram showing an internal configuration of the image forming apparatus G.

The image forming apparatus G includes a control section 10 (correction section, image processing control section, output control section and output timing switching section), a data storage section 20 (external storage section), a flow control section 30, an image processing section 40, a communication section 51, and operation display section 52, a conveyance driving section 53, an image forming section 54, a imaging section 55, a clock switching section 56 (clock input switching section), a bus 57 and such like.

The control section 10 integrally controls the entire operation of the image forming apparatus G. The control section 10 includes a CPU 11 (Central Processing Unit) and a RAM 12 (Random Access Memory), a memory management section 13 and such like.

The CPU 11 performs various types of arithmetic processing and performs control operation by loading a control program stored in an HDD 21 and such like in the data storage section 20 into the RAM 12 and executing the program. The control program includes a program for analyzing imaging data acquired from the imaging section 55 and monitoring image quality. The CPU 11 analyzes the imaging data obtained from the imaging section 55 to obtain image quality information such as density change of the formed image. Then, in a case where the image quality is out of a predetermined range, for example, in a case where the image quality is shifted from initial setting for a predetermined level or more, the CPU 11 outputs correction request together with correction information to the image processing section 40. The CPU 11 can also detect the shift amount of output position on continuous form on which each color image of CMYK is output, and output a request for correction (registration) of the shift amount to the image processing section 40. The image monitoring operation may be performed by using a configuration dedicated for image analysis in addition to or instead of the software operation by the control section 10.

The RAM 12 provides memory space for working to the CPU 11 and stores a program being executed and temporal data. As the RAM 12, a normal volatile memory, for example, a DRAM can be used. Alternatively, the RAM 12 may include another volatile memory such as a SRAM and a non-volatile memory such as a flash memory.

The memory management section 13 sets memory addresses (page address) in the RAM 12 and the data storage section 20 and sets reading and writing addresses. The memory management section 13 can assign a memory address dynamically, and manages swap area on the HDD 21. The memory management section 13 can also set a position to store image data to which image processing was performed by the output image processing section 41 of the image processing section 40. The memory management operation can also be set to be executed by the CPU 11 by software.

The data storage section 20 stores various programs, setting data, bit map data of image formation target, pixmap data (image data) and such like. The data storage section 20 includes an HDD 21 (Hard Disk Drive), a DRAM 22 and such like. In the HDD 21, control programs to be executed by the CPU 11 of the control section 10, setting data to be used and such like are stored.

The DRAM 22 is, here, provided exclusively for storing image data which is the image formation target obtained from outside via the communication section 51 and print job data according to image formation of the image data, and the image data and the print job data are deleted when the image formation is finished. The image data stored in the DRAM 22 is, here, formed of data for a plurality of colors such as C (cyan), M (magenta), Y (yellow) and K (black) corresponding to color image formation.

The flow control section 30 outputs image data which was input from the communication section 51 or read out from the DRAM 22 at an appropriate timing and transmits the image data to the output image processing section 41 on the basis of the control by the control section 10.

The image processing section 40 converts the image data which is the image formation target into format data (raster data) for image formation by the image formation section 54, performs correction according to the characteristics of the image forming section 54 and outputs the data to the image forming section 54 at an appropriate timing. The image processing section 40 includes the output image processing section 41, a delay adjustment section 42 (output section) and such like. The image processing section 40 is formed as an ASIC (Application Specific Integrated Circuit).

The output image processing section 41 performs predetermined image processing according to image formation with respect to the image data which is the image formation target, and generates raster data for image formation. The predetermined image processing includes edge enhancement, color tone correction, density correction, half toning and such like. Parameters according to setting of the image processing with respect to the image data can be corrected (adjusted) by control signals from the control section 10.

The delay adjustment section 42 outputs the processed image data (raster data) to which image processing was performed by the output image processing section 41 to the image forming section 54 at an appropriate timing in accordance with the operation timings according to the image formation by the image forming section 54 and the conveyance driving section 53. In the embodiment, since the image formation for each color of CMYK is performed in order by the image forming section 54 as described later, the output timing of each color data is also adjusted according to the shift of image formation timing for each color. The output timing can be adjusted as needed by the control section 10 monitoring the imaging data obtained by the imaging section 55.

The communication section 51 is an interface according to communication between an external device and the image forming apparatus G, and is a network card and the driver thereof, for example. The communication section 51 receives image data and print job data of the image formation target transmitted from the external device and transmits the data to the control section 10 and the data storage section 20. The communication section 51 also transmits a status signal according to the image formation output from the control section 10 to the external device.

The operation display section 52 receives user's input operation to the operation section such as a push button switch and various operation keys. The operation display section 52 includes a display screen such as a liquid crystal display and displays various menus and status on the basis of the control signal from the CPU 11. A touch sensor may be provided on the display screen so as to receive the operation as a touch panel. The target to form images can be switched by an input operation to the operation display section 52. That is, the recording medium to output the image can be selectively switched between continuous form and normal cut paper.

The conveyance driving section 53 includes a rotation motor, for example, and operates the paper feeding roller 6 and the paper ejection roller 7 to convey the continuous form at a predetermined speed.

The image forming section 54 forms an image based on the raster data of the image formation target, which was transmitted from the image processing section 40, on the surface of continuous form conveyed by the conveyance driving section 53 and transmitted to the image forming apparatus main body 1. The image forming section 54 uses a tandem configuration which separately includes image forming units for respective CMYL colors. The image forming units include exposure sections 54*c*, 54*m*, 54*y* and 54*k* (see FIG. 3), developing sections and photoreceptors, respectively. The exposure sections perform optical scanning on the charged and rotating photoreceptors, and perform exposure to the portions corresponding to respective pixels of the photoreceptors with the amount of light based on the raster data according to the respective colors (a plurality of colors) of CMYK to form electrostatic latent images. The developing sections develop the electrostatic latent images formed on the respective photoreceptor with toner. The images formed on the respective photoreceptors in the four image forming units which are disposed in parallel with each other are transferred onto the continuous form via an intermediate transfer belt or the like so as to be superposed on each other. The toner transferred onto the continuous form is fixed by the fixing section.

The imaging section 55 includes a CCD sensor or a CMOS sensor, for example, picks up the formed image and transmits the imaging data to the control section 10. The sensor of the imaging section 55 is a line sensor which can picks up the image over the entire width of the continuous form in the width direction orthogonal to the conveyance direction of continuous form. In a case where the imaging is necessary in a two-dimensional plane, the sensor continuously performs imaging according to the conveyance of the continuous form.

The imaging section 55 and the control section 10 form an image quality monitoring section.

The clock switching section 56 switches on/off of the input of clock signal to the flow control section 30 and the output image processing section 41 among the clock signals supplied from an oscillation circuit and a dividing circuit not shown in the drawings to the sections of the image forming apparatus G. The clock switching section 56 turns off the input of the clock signal to the flow control section 30 and the output image processing section 41 on the basis of the control signal of the control section 10 during a period when the flow control section 30 and the output image processing section 41 do not operate.

The image processing apparatus of the embodiment is configured by including the control section 10 and the image processing section 40, and can include the clock switching section 56.

The bus 57 is a path for transmitting and receiving various types of data and commands between the sections. As the bus 57, for example, a connection interface standard such as a serial ATA and an input/output interface standard such as a PCI express are used and able to transmit data fast.

Next, the image processing procedure in the embodiment will be described.

Figure 3:
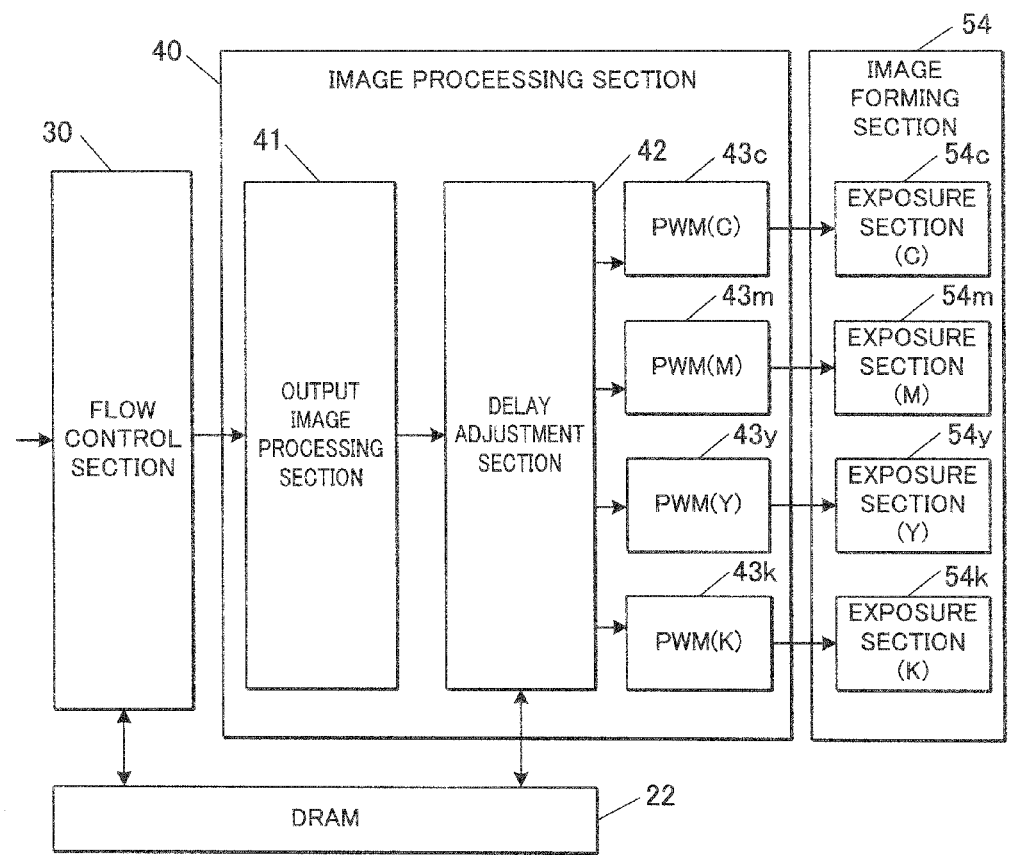
FIG. 3 is a view for explaining flow of image data which is the image formation target of the image forming apparatus in the embodiment.

FIG. 3 is a view for explaining the flow of image data of the image formation target in the image forming apparatus G of the embodiment.

When input from the communication section 51, the image data of image formation target is stored in the DRAM 22 and input to the flow control section 30 before start of the image formation. The image data is output from the flow control section 30 and input to the image processing section 40 at a predetermined timing, various types of image processing is performed by the output image processing section 41 and raster data (processed image data) for image formation is generated.

The raster data after the image processing is once output outside from the image processing section 40 and stored in the DRAM 22. Thereafter, the raster data is read out from the DRAM 22 in accordance with the image formation by the image forming section 54 and input to the delay adjustment section 42. The delay adjustment section 42 outputs raster data for respective colors (a plurality of colors) of CMYK in accordance with the respective shifts of timings at which optical scanning is performed on the photoreceptors. Pulse width modulation according to optical scanning is performed to the raster data output from the delay adjustment section 42 by the respective modulation sections (PWM)

43*c*, 43*m*, 43*y* and 43*k*, and the modulated data is output as pulse signals to the exposure sections 54*c*, 54*m*, 54*y* and 54*k* of the image forming section 54. The pulse width modulation may be performed inside the image forming section 54.

Figure 4:
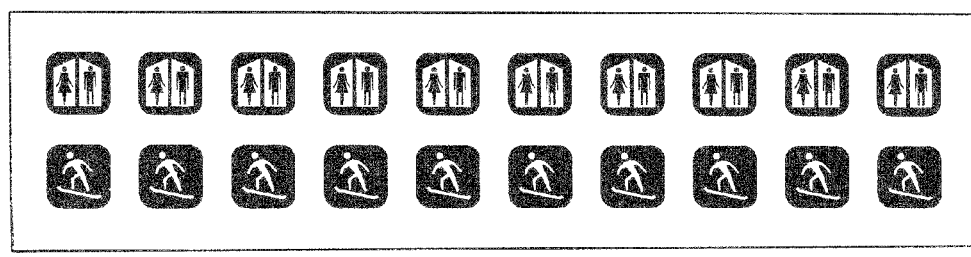
FIG. 4 is a view showing an example of image pattern which is formed by the image forming apparatus in the embodiment.

FIG. 4 is a view showing an example of image pattern formed by the image forming apparatus G in the embodiment.

A plurality of small figures such as seals can be repeatedly arranged as a pattern over the width direction (lateral direction of FIG. 4) of image formation. Similarly, same or different images can be arranged as a pattern in the conveyance direction (longitudinal direction of FIG. 4) to form images by repeating the pattern (repeating operation). Thus, a large amount of same images (including a combination of a plurality of images) are formed by the image forming apparatus G without waste. In a case of such repeating operation for forming same images on continuous form, during the repeating operation, raster data according to the image pattern is read out from the DRAM 22 every time and input (repeatedly input) to the delay adjustment section 42. Thus, it is not necessary to perform image processing to the same image pattern data by the output image processing section 41 many times.

On the other hand, in a case where the specifics (parameters, for example) of the image processing by the output image processing section 41 are changed, the original image data to which image processing is not performed is read out from the DRAM 22 and input to the flow control section 30 again to make the output image processing section 41 perform image processing with the changed image processing specifics. Thereby, raster data based on the changed image processing is generated and the image formation is repeatedly performed on the basis of the changed raster data. The changed raster data is stored in the DRAM 22.

At this time, as mentioned above, when images are formed so as to be located tight on the continuous form, the repeatedly-formed images have small intervals therebetween, and thus, the time when the raster data is not output from the delay adjustment section 42 is very short. As a result, it is difficult to replace the data with the raster data whose processing specifics are changed between the output intervals of raster image.

Figure 5:
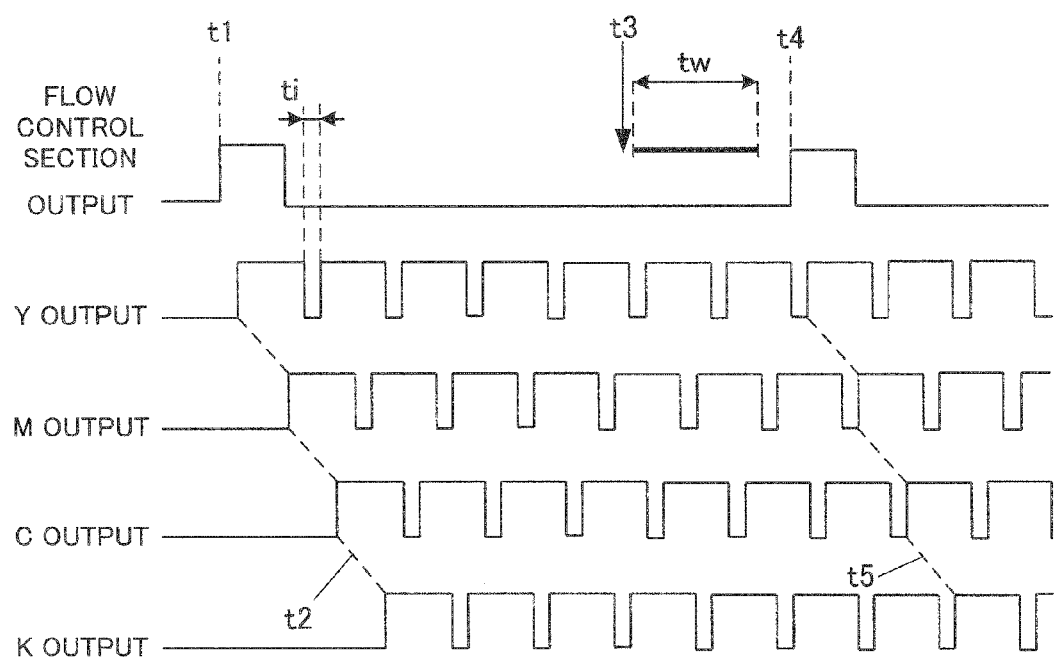
FIG. 5 is a time chart showing image data input/output timing of image processing section.

FIG. 5 is a flow chart showing image data input/output timing of the image processing section 40.

When raster data is input from the flow control section 30 to the image processing section 40 (t1), after the image processing is performed by the output image processing section 41, the output of the processed raster data from the delay adjustment section 42 is started so as to be delayed for different periods of time for the respective colors of YMCK (t2).

Thereafter, while the same images are being output, the input of raster data from the flow control section 30 to the image processing section 40 is not performed, and the processed raster data which is stored in the DRAM 22 is repeatedly input. As mentioned above, in a case where the formed images have small repeating intervals, the output interval ti of raster data is also small, and the time ti is smaller than the time tw required for setting a corrected image processing parameter to the output image processing section 41.

After the formation of same image is repeated a plurality of times, when the image processing parameter needs to be corrected (t3), correction writing of parameter according to the setting of image processing by the output image processing section 41 is performed (tw). After the writing is performed, image data which is not processed is once input from the DRAM 22 to the flow control section 30, output to the image processing section 40 at an appropriate timing (t4), and processed raster data is stored in the DRAM 22. Normally, the capacity of DRAM 22 provided outside the ASIC of image processing section 40 is sufficiently large compared to the raster data. Thus, the new raster data to which the corrected processing was performed can be temporarily stored in parallel with the original raster data. Accordingly, the image formation is continued by using the original raster data until all of the new raster data is stored in the DRAM 22, and after all of the new raster data is obtained, on the basis of the new raster data, it is started to form images to which the corrected image processing was performed (t5).

In a case where the recording medium to output the image is set to be normal cut paper, the correction parameter can be set sufficiently between the outputs to sheets of cut paper. Thus, as usual, the control section 10 directly flows raster data (processed image data) after the corrected image processing was performed from the output image processing section 41 to the delay adjustment section 42 so as to be able to perform image formation at an output timing of raster data according to the cut paper.

Figure 6:
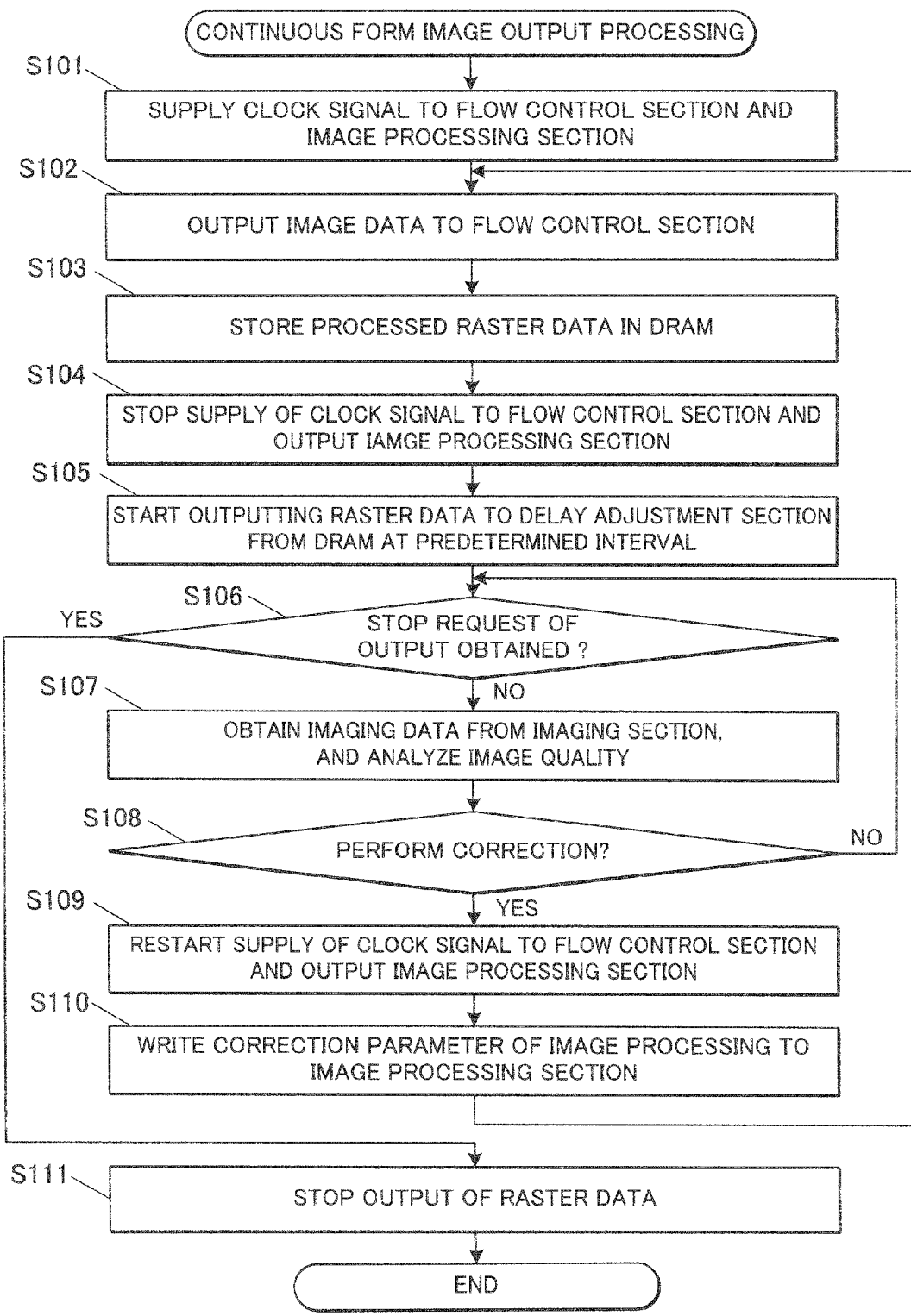
FIG. 6 is a flowchart showing a control procedure of continuous form image output processing.

FIG. 6 is a flowchart showing a control procedure by the control section 10 of the continuous form image output processing executed in the image forming apparatus G of the embodiment.

The continuous form image output processing is started when the print job is obtained via the communication section 51 and when a print command from the user is input to the operation display section 52, for example.

When the continuous form image output processing is started, the control section 10 (CPU 11) first outputs a control signal to the clock switching section 56, and supplies clock signals of a predetermined frequency to the image processing section 40 and the flow control section 30 (step S101).

The control section 10 inputs image data of the image to be formed from the DRAM 22 to the flow control section 30 (step S102). The control section 10 stores, in the DRAM 22, raster data which was output from the flow control section 30 and subjected to image processing by the output image processing section 41 of the image processing section 40 (step S103). The control section 10 controls the clock switching section 56 to stop input of clock signals to the flow control section 30 and the output image processing section 41 (step S104).

The control section 10 starts the operation of reading out the raster data from the DRAM 22 and outputting the data to the delay adjustment section 42 in the image processing section 40 at intervals corresponding to the image formation speed by the image forming section 54, and the control section 10 outputs the raster data from the delay adjustment section 42 to the image forming section 54 at appropriate intervals (step S105). The output operation of raster data is continuously executed in parallel with other processes of continuous form image output processing. The raster data is output a specified number of times if the number is specified by the print job or the input operation to the operation display section 52, and if the number is not specified, the output of raster data is indefinitely repeated until a stop command is obtained. The stop command includes a stop command obtained from outside by the user's operation and an internal stop command due to an error such as paper out.

In a case where the processing of control section 10 is returned from the processing of after-mentioned step S110 to the processing of step S102, and thereafter the processing of step S105 is executed again, the previous processing of step S105 being executed may be maintained so as not to perform new processing. Alternatively, the processing of step S105 may be reset or restarted, and it is preferable that the time interval between the last output timing according to the previous processing of step S105 and the first output timing according to the restarted processing of step S105 is equal to the above-mentioned interval corresponding to the image formation speed.

The control section 10 determines whether there is a stop request of image output (whether the stop command was obtained) (step S106). If it is determined that there is a stop request (step S106: YES), the output of processed raster data by the above-mentioned processing of step S105 is stopped to stop the image formation in the image forming section 54 (step S111). Then, the control section 10 ends the continuous form image output processing.

If it is not determined that there is a stop request (step S106: NO), the control section 10 next obtains imaging data from the imaging section 55 and analyzes image quality (step S107). The control section 10 determines whether the output image processing needs to be corrected on the basis of a predetermined correction condition such as an analysis result of image quality and a preset number of times of image formation (step S108).

If it is not determined that the output image processing needs to be corrected (step S108: NO), the processing of control section 10 returns to step S106. If it is determined that the output image processing needs to be corrected (step S108: YES), the control section 10 outputs a control signal to the clock switching section 56 and restarts the supply of clock signal to the flow control section 30 and the output image processing section 41 (step S109). The control section 10 writes correction data on a parameter according to the setting of specifics of image processing by the output image processing section 41 (step S110). Then, the processing of control section 10 returns to step S102.

As described above, the embodiment of the image processing apparatus of the present invention includes: the output image processing section 41 which performs, on image data, predetermined image processing according to image formation; the delay adjustment section 42 which outputs image-processed raster data in accordance with the operation timing according to image formation by the image forming section 54; and the control section 10. The control section 10 corrects the setting according to the image processing to the image data, controls operations of the output image processing section 41, stores raster data in the DRAM 22 of data storage section 20 located outside the image processing section 40 and performs correction depending on a predetermined correction condition, and reads out the raster data from the DRAM 22 to input the raster data to the delay adjustment section 42.

Then, during the repeating operation of forming a same image on continuous form by the image forming section 54, the control section 10 repeatedly inputs raster data from the DRAM 22 to the delay adjustment section 42, and corrects a parameter according to image processing in parallel with the repeating operation. When the raster data to which the image processing by the corrected parameter was performed is stored in the DRAM 22, the control section 10 switches raster data to be input to the delay adjustment section 42 to the raster data which was subjected to the image processing after correction at the next timing of inputting raster data to the delay adjustment section 42.

Accordingly, it is possible to separately set a correction parameter in parallel with repeating inputs, the correction parameter being difficult to set between the repeating inputs of raster data according to the repeating image formation on continuous form. Thus, the image formation does not need to be interrupted and the image formation can be performed fast.

Furthermore, since it is not necessary to store both of the uncorrected correction parameter and the corrected parameter, the memory capacity of image processing section 40 needs not be increased. Similarly, the raster data according to the uncorrected correction parameter and the raster data according to the corrected correction parameter are stored in the DRAM 22 which normally has no problem regarding capacity limitation and can be added easily. Thus, the memory capacity of image processing section 40 needs not be increased. Accordingly, it is possible to largely reduce trouble and cost of design change according to memory addition of conventional image processing section 40 formed of ASIC and such like, and also suppress the increase in cost according to the increase in memory capacity compared to the case of external installation.

Since both of the image-processed raster data and the image data before image processing are stored until the image formation is finished, it is possible to easily change the correction parameter to perform image processing and obtain new raster data at any time.

In a case where image formation is performed by repeating a same image, image processing is not performed every time, and thus, it is possible to reduce the load of processing and suppress the power consumption.

The image processing executed by the output image processing section 41 includes density correction and color tone correction, and it is possible to form many images promptly without lowering the image formation speed while maintaining the image homogeneous by frequently correcting the density and color tone which change easily due to the large amount of image formation.

The image processed raster data can be stored in the same DRAM 22 as that of the image data. In a case where there is no other memory suitable for reading and writing raster data, by storing the input image data in the same place, it is not necessary to add another memory which leads to cost increase.

The image data as the image formation target may be a color image. Even in such case where the size of image data is large, it is not necessary to add a storage region to the image processing section 40 formed of ASIC. Accordingly, it is possible to avoid cost increase due to the design change from conventional configurations and the memory addition itself.

In a case where the color image is output to the tandem image forming section 54, the output timings of raster data for respective CMYK colors are shifted from each other, and thus, the output switching timings for switching between the image-processed data before correction and the image-processed data after correction are also shifted. Thus, it is necessary to switch the timings in order in accordance with the output timings by maintaining raster data of images both before and after correction, leading to the increase in the necessary memory capacity. In the embodiment, such memory is secured outside, and thus, it is not necessary to enlarge the image processing section 40 and change the design thereof, and the image formation can be performed fast while correcting the image processing easily at low cost.

Since the output timing of raster data can be switched between the output timing for repeating image formation on continuous form and the output timing for image formation on each sheet of cut paper, when the data is output to cut paper, it is possible to reduce the control load by simplifying the processing as in the conventional manner.

Also, the clock switching section 56 is provided so as to turn off the input of clock signal (not to supply clock signal) to the output image processing section 41 and the flow control section 30 after once outputting raster data from the output image processing section 41 until performing correction of parameter according to the setting of image processing. Thus, unnecessary clock signal is not supplied while the sections do not operate, and the power consumption can be reduced.

The image forming apparatus G in the embodiment includes: the data storage section 20 including DRAM 22; the image forming section 54; and the imaging section 55 which picks up the image for monitoring image quality of the image formed by the image forming section 54 by using raster data, and the control section 10 determines whether to perform correction of the processing setting of output image processing section 41 on the basis of a predetermined image quality condition.

Accordingly, it is automatically determined whether to perform correction according to the image processing by objectively and easily analyzing the image which is formed in nearly real time. Thus, the image quality can be maintained to be nearly uniform while effortlessly performing high-speed image formation.

Furthermore, since the recording medium to form an image can be selectively switched between continuous form and cut paper, it is possible to use the image forming apparatus G flexibly according to the image to be formed.

MODIFICATION EXAMPLE

Figure 7:
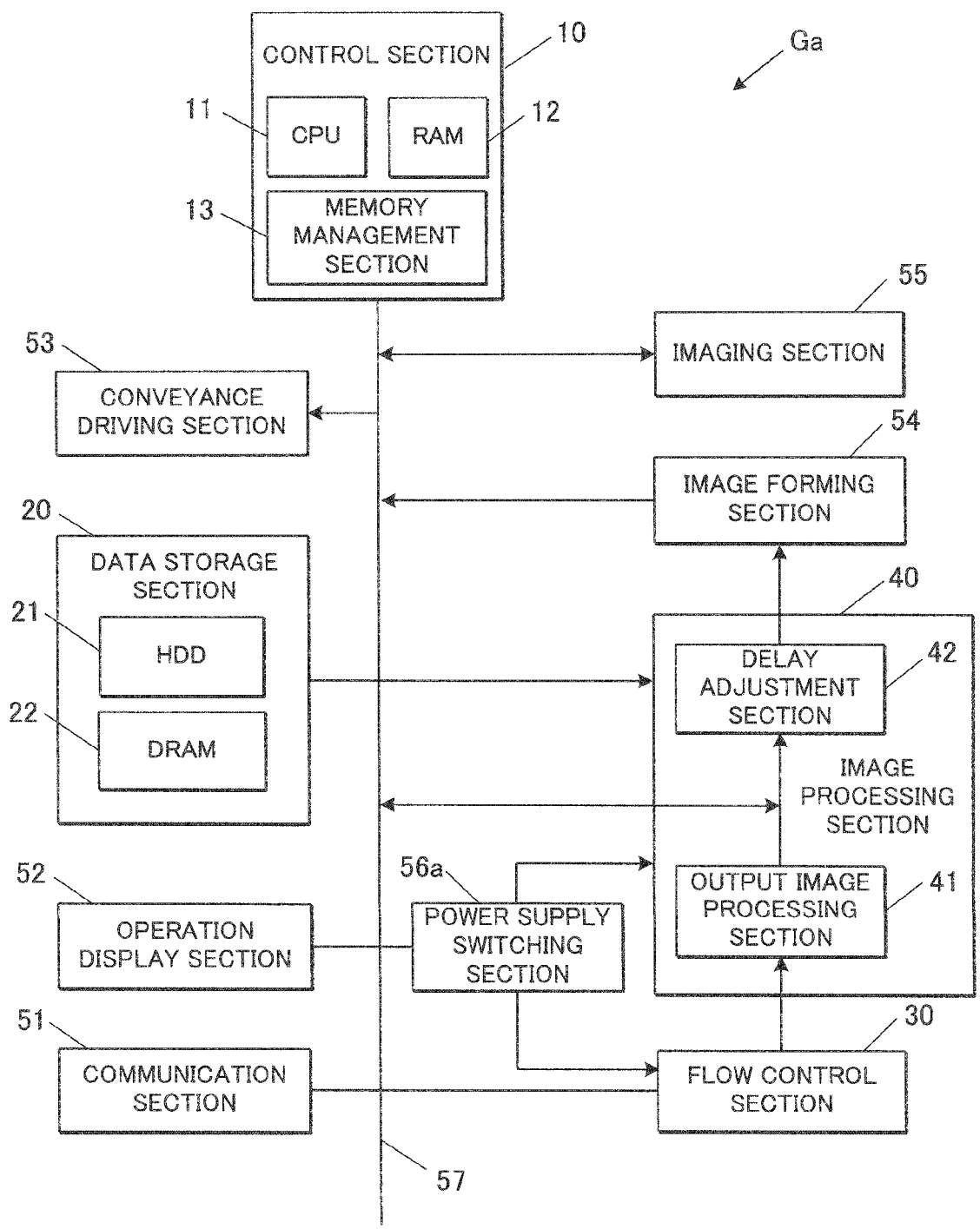
FIG. 7 is a block diagram showing a modification example of internal configuration of the image forming apparatus.

FIG. 7 is a block diagram showing a modification example of internal configuration of image forming apparatus.

The image forming apparatus Ga of the modification example is similar to the image forming apparatus G of the above embodiment except that the clock switching section 56 is replaced with the power supply switching section 56a. Thus, the explanation thereof is omitted by providing same reference numerals to the same components.

The power supply switching section 56a (power source switching section) switches whether to supply (turn on or off) electric power to the flow control section 30 and the output image processing section 41 among the electric power supplied to the sections of image forming apparatus Ga from the power source not shown in the drawings. The power supply switching section 56a stops the power supply to the flow control section 30 and the output image processing section 41 while the flow control section 30 and the output image processing section 41 do not operate on the basis of the control signal of the control section 10.

In such way, the power supply switching section 56a which switches on and off of the power supply to the flow control section 30 and the output image processing section 41 is provided to the image processing section which forms the image processing apparatus included in the image forming apparatus Ga in the modification example. After the raster data is output from the output image processing section 41 until correction is performed to the parameter according to setting of image processing, that is, while the flow control section 30 and the output image processing section 41 do not operate, not only the clock signal but also the power supply itself is turned off (stopped), and thus, the power consumption can be reduced effectively in a case where the output image processing is executed less frequently compared to the number of image output as in the image processing apparatus Ga according to the present invention.

The present invention is not limited to the above embodiment and various changes can be made.

For example, the image data as the image formation target and the image-processed raster data are stored in the same DRAM 22 in the above embodiment; however, the data may be stored in different storage sections as long as the input and output of data can be executed at a necessary speed.

The clock signal or the electric power is not supplied to the output image processing section 41 and the flow control section 30 when the output image processing is not performed in the embodiment and the modification example thereof; however, the clock signal or electric power may be continuously supplied without providing such configuration.

In the embodiment, only the normal image as the image formation target is repeatedly formed and the formed image is picked up by the imaging section 55 to analyze image quality and determines correction; however, the imaging and determination of correction may be performed by interrupting the output by an image dedicated for test at an appropriate interval, that is, in general, sufficiently less frequently compared to the number of times of repeating normal image. Also in this case, after the repeating operation of normal image formation is restarted, it is possible to perform actual correction, output image processing reflecting the correction, and the image formation by raster data on which the image processing after reflecting the correction was performed as in the above embodiment.

The embodiment has been explained by taking an example in which a color image is formed by a tandem electrophotographic image forming apparatus; however, a monochrome image, especially, a grayscale image may be formed.

The output target is not limited to a small one such as seal as long as the image is repeatedly formed at small intervals on continuous form paper. The recording medium is not limited to paper, and may be other types of sheets such as films and fabrics.

The correction according to the setting of image processing does not need to be performed to all the setting data and only a part to be changed may be transmitted. Correction may be determined faster by a strict standard of correction, while transmitting the correction command for each of the divided parameters to gradually perform correction over a plurality of times. Such correction which is divided a plurality of times may not be performed at the first correction when starting the image formation, and may be set effective only when the image formation is repeated stably.

The control section 10 performs all the control operations in the embodiment; however, another control section may perform the image formation and the processing according to correction. For example, a dedicated control section may be provided to the image processing section 40 to directly obtain data from the imaging section 55 and perform analysis and determination of correction.

The other specifics of the configurations, locations, control procedures and control contents shown in the embodiment can be appropriately changed within a scope of the present invention.

The entire disclosure of Japanese Patent Application No. 2014-094615 filed on May 1, 2014 including description, claims, drawings, and abstract are incorporated herein by reference in its entirety.

What is claimed is:
1. An image processing apparatus, comprising:
an image processing circuit which includes:
an output image processing section which performs, on image data, predetermined image processing accord- ing to image formation to be performed by an image forming section, to thereby generate processed image data; and an output section that outputs the processed image data in accordance with an operation timing according to the image formation by the image forming section; and a processor which is configured to:

store, as original image data, the image data on which the predetermined image processing has not yet been performed, in an external memory, which is a structural element external to the image processing circuit;

correct a setting of the predetermined image processing which is performed on the image data;

control an operation of the image processing circuit, store the processed image data in the external memory, and control correction of the setting of the predetermined image processing depending on a predetermined correction condition; and read out the processed image data from the external memory and input the processed image data to the output section of the image processing circuit, wherein the image processing circuit outputs the processed image data, which is input to the output section thereof from the external memory, to the image forming section, without again performing the predetermined image processing on the processed image data, wherein the processor repeatedly inputs the processed image data from the external memory to the output section of the image processing circuit during a repeating operation of forming a same image on a continuous recording medium by the image forming section, and the image processing circuit outputs the processed image data, which is repeatedly input to the output section thereof during the repeating operation, to the image forming section, without again performing the predetermined image processing on the processed image data, wherein, in a case in which the processor corrects the setting of the predetermined image processing in accordance with the predetermined correction condition during the repeating operation, the processor (i) reads out the original image data from the external memory and inputs the original image data to the output image processing section of the image processing circuit, (ii) controls the output image processing section of the image processing circuit to perform the predetermined image processing on the original image data using the corrected setting to generate new processed image data, and (iii) stores the new processed image data in the external memory, and wherein, (a) while the new processed image data is being generated by the output image processing section of the image processing circuit and stored in the external memory, the processor continues reading out the processed image data which was generated before the correction of the setting from the external memory, inputting the processed image data generated before the correction to the output section of the image processing circuit, and controlling the output section of the image processing circuit to output the processed image data generated before the correction to the image forming section, and (b) when all of the new processed image data is generated and stored in the external memory, the processor switches the processed image data to be input to the output section of the image processing circuit from the processed image data generated before the correction to the new processed image data generated after the correction which is stored in the external memory, such that the repeating operation is continued on the basis of the new processed image data.

2. The image processing apparatus of claim 1, wherein the predetermined image processing includes density correction and color tone correction.

3. The image processing apparatus of claim 1, wherein the image data includes pieces of data for a plurality of colors according to a color image.

4. The image processing apparatus of claim 3, wherein the image forming section which performs the image formation performs optical scanning, exposure and development on different photoreceptors on the basis of the respective pieces of data for the plurality of colors, and transfers developed images onto the recording medium so as to be superposed on each other, and the output section of the image processing circuit outputs the pieces of data for the plurality of colors in accordance with respective shifts of timings of the optical scanning.

5. The image processing apparatus of claim 1, wherein the processor is configured to switch between an output timing of the processed image data in a case where image formation is repeatedly performed on the continuous recording medium and an output timing of the processed image data in a case where image formation is performed on each of a plurality of divided pieces of recording medium.

6. The image processing apparatus of claim 1, wherein the processor is configured to perform control to switch on and off input of a clock signal to the output image processing section of the image processing circuit, wherein the the processor performs control to switch off the input of the clock signal to the output image processing section of the image processing circuit after the processed image data is output therefrom until the correction is performed.

7. The image processing apparatus of claim 1, wherein the processor is configured to switch on and off power supply to the output image processing section of the image processing circuit, wherein the processor performs control to switch off the power supply to the output image processing section of the image processing circuit after the processed image data is output therefrom until the correction is performed.

8. An image forming apparatus, comprising:
the image processing apparatus of claim 1;
the external memory;
the image forming section;
wherein the processor monitors image quality of an image formed by the image forming section using the processed image data and determines whether to correct the setting of the predetermined image processing by the output image processing section of the image processing circuit on the basis of a predetermined image quality condition, as the predetermined correction condition.

9. The image forming apparatus of claim 8, further comprising a paper feeding switching section which selectively switches a recording medium for forming an image between the continuous recording medium and a recording medium which is divided into pieces.

* * * * *